(12) United States Patent
Klebanov et al.

(10) Patent No.: US 11,332,222 B2
(45) Date of Patent: May 17, 2022

(54) RAMPED PONTOON FOR RETRIEVING A POOL CLEANER

(71) Applicant: ZODIAC POOL SYSTEMS LLC, Carlsbad, CA (US)

(72) Inventors: Aleksandr Klebanov, Bloomfield, NJ (US); Ethan Hanan, Teaneck, NJ (US); Anthony Meletta, Little Falls, NJ (US); William Londono, Wayne, NJ (US); Kameshwar Durvasula, Garfield, NJ (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 308 days.

(21) Appl. No.: 16/593,258

(22) Filed: Oct. 4, 2019

(65) Prior Publication Data

US 2020/0031433 A1 Jan. 30, 2020

Related U.S. Application Data

(62) Division of application No. 15/578,389, filed as application No. PCT/US2016/034266 on May 26, 2016, now abandoned.

(Continued)

(51) Int. Cl.
*B63B 35/34* (2006.01)
*E04H 4/16* (2006.01)
(Continued)

(52) U.S. Cl.
CPC .............. *B63B 35/34* (2013.01); *B63H 5/02* (2013.01); *C02F 1/004* (2013.01); *E04H 4/1654* (2013.01);
(Continued)

(58) Field of Classification Search
CPC . B63B 35/34; B63B 2205/06; B63B 2708/00; B63H 5/02; E04H 4/1654; C02F 1/004
(Continued)

(56) References Cited

U.S. PATENT DOCUMENTS

| 4,040,864 A | 8/1977 | Steeves |
| 4,581,075 A | 4/1986 | St. Martin |

(Continued)

FOREIGN PATENT DOCUMENTS

| CN | 100493937 | 6/2009 |
| DE | 3105270 | 9/1982 |

(Continued)

OTHER PUBLICATIONS

U.S. Appl. No. 15/578,389, "Final Office Action", dated May 7, 2019, 12 pages.

(Continued)

*Primary Examiner* — Daniel V Venne
(74) *Attorney, Agent, or Firm* — Kilpatrick Townsend & Stockton LLP

(57) ABSTRACT

A floating platform dimensioned and configured to receive and transport an automated pool cleaner on the surface of the water is disclosed. For convenience, the floating platform is referred to as a pontoon. The pontoon is also configured to control the retrieval of the pool cleaner. The pontoon includes a buoyant housing having a first end and a second end. An inclined platform ramp is positioned in the pontoon housing at an angle from the first end towards the second end. The pontoon includes a winch for winding and unwinding a cable connected to the pool cleaner to thereby selectively release and retrieve the cleaner.

7 Claims, 13 Drawing Sheets

Related U.S. Application Data

(60) Provisional application No. 62/169,360, filed on Jun. 1, 2015.

(51) Int. Cl.
 *B63H 5/02* (2006.01)
 *C02F 1/00* (2006.01)
 *B08B 1/04* (2006.01)
 *B08B 3/04* (2006.01)
 *C02F 103/42* (2006.01)

(52) U.S. Cl.
 CPC . *B08B 1/04* (2013.01); *B08B 3/04* (2013.01); *B63B 2205/06* (2013.01); *C02F 2103/42* (2013.01)

(58) Field of Classification Search
 USPC .... 440/90–93; 114/253, 254, 292, 312, 313, 114/322
 See application file for complete search history.

(56) References Cited

U.S. PATENT DOCUMENTS

| | | | |
|---|---|---|---|
| 4,674,048 A | 6/1987 | Okumura | |
| 6,485,638 B2 | 11/2002 | Henkin et al. | |
| 7,118,678 B2 | 10/2006 | Porat | |
| 2001/0032809 A1 | 10/2001 | Henkin et al. | |
| 2005/0217552 A1 | 10/2005 | Lamoureux et al. | |
| 2011/0016646 A1 | 1/2011 | Pichon et al. | |
| 2011/0247970 A1 | 10/2011 | Evingham | |
| 2012/0222997 A1 | 9/2012 | Potucek et al. | |
| 2014/0262997 A1* | 9/2014 | Renaud | E04H 4/1654 210/138 |
| 2015/0101135 A1 | 4/2015 | Witelson et al. | |
| 2017/0356211 A1 | 12/2017 | Rejniak et al. | |
| 2018/0155945 A1 | 6/2018 | Londono et al. | |

FOREIGN PATENT DOCUMENTS

| | | |
|---|---|---|
| EP | 1122382 | 8/2001 |
| FR | 2927346 | 8/2009 |
| KR | 101391526 | 5/2014 |

OTHER PUBLICATIONS

U.S. Appl. No. 15/578,389, "Non-Final Office Action", dated Nov. 27, 2018, 10 pages.

PCT/US2016/034266, "International Preliminary Report on Patentability", dated Dec. 14, 2017, 10 pages.

PCT/US2016/034266, "International Search Report and Written Opinion", dated Sep. 1, 2016, 12 pages.

* cited by examiner

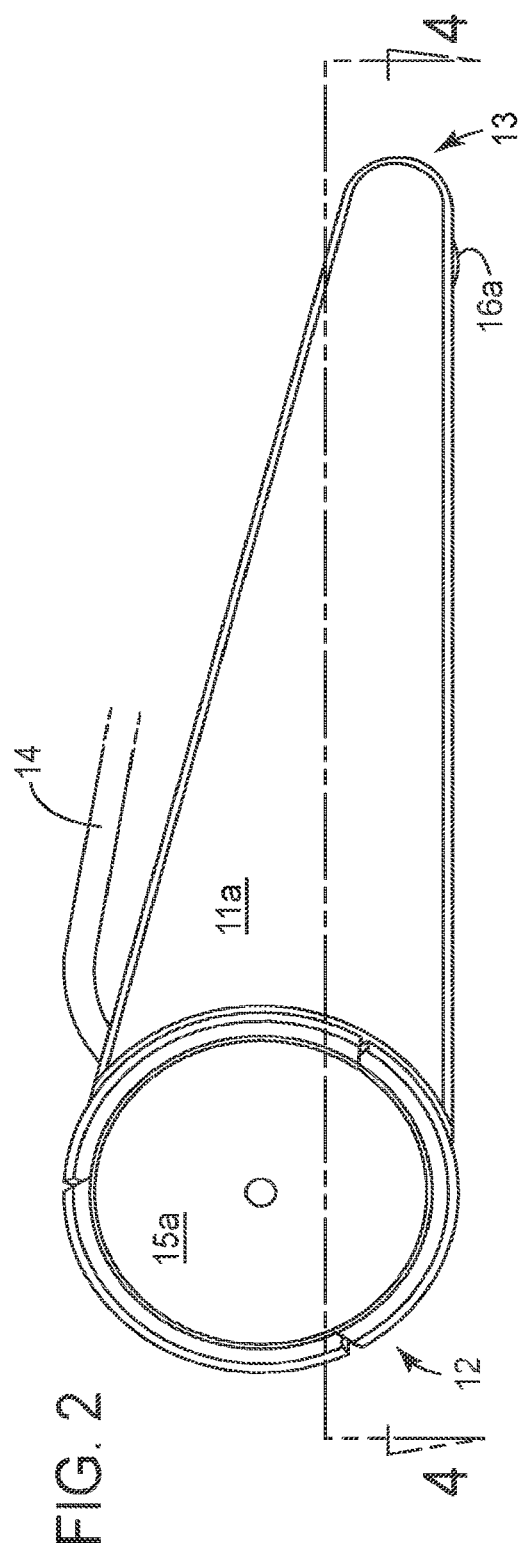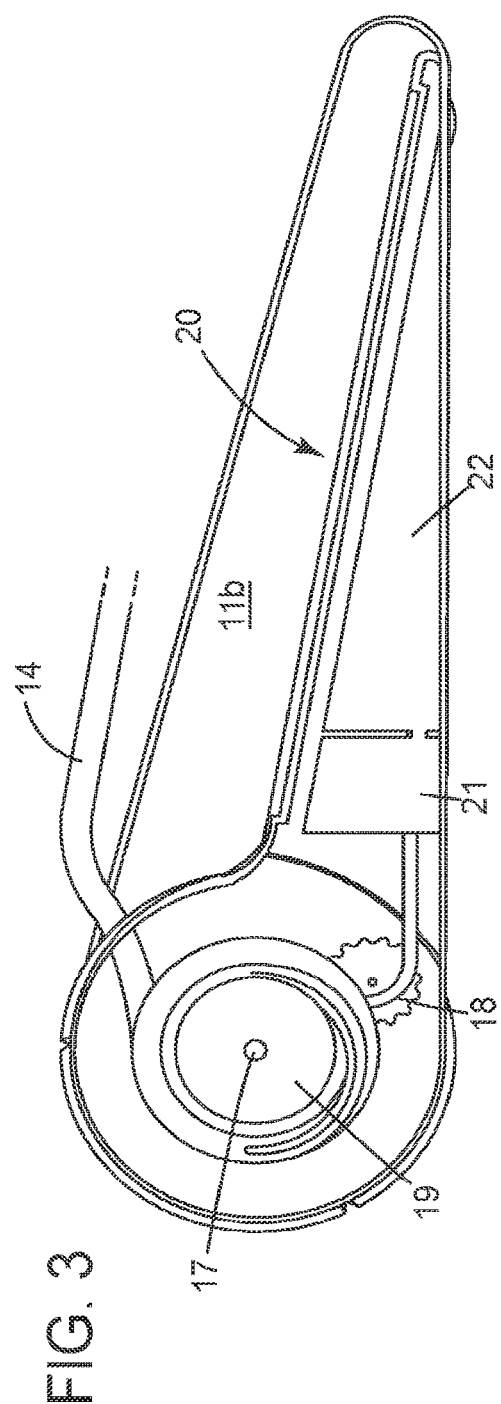

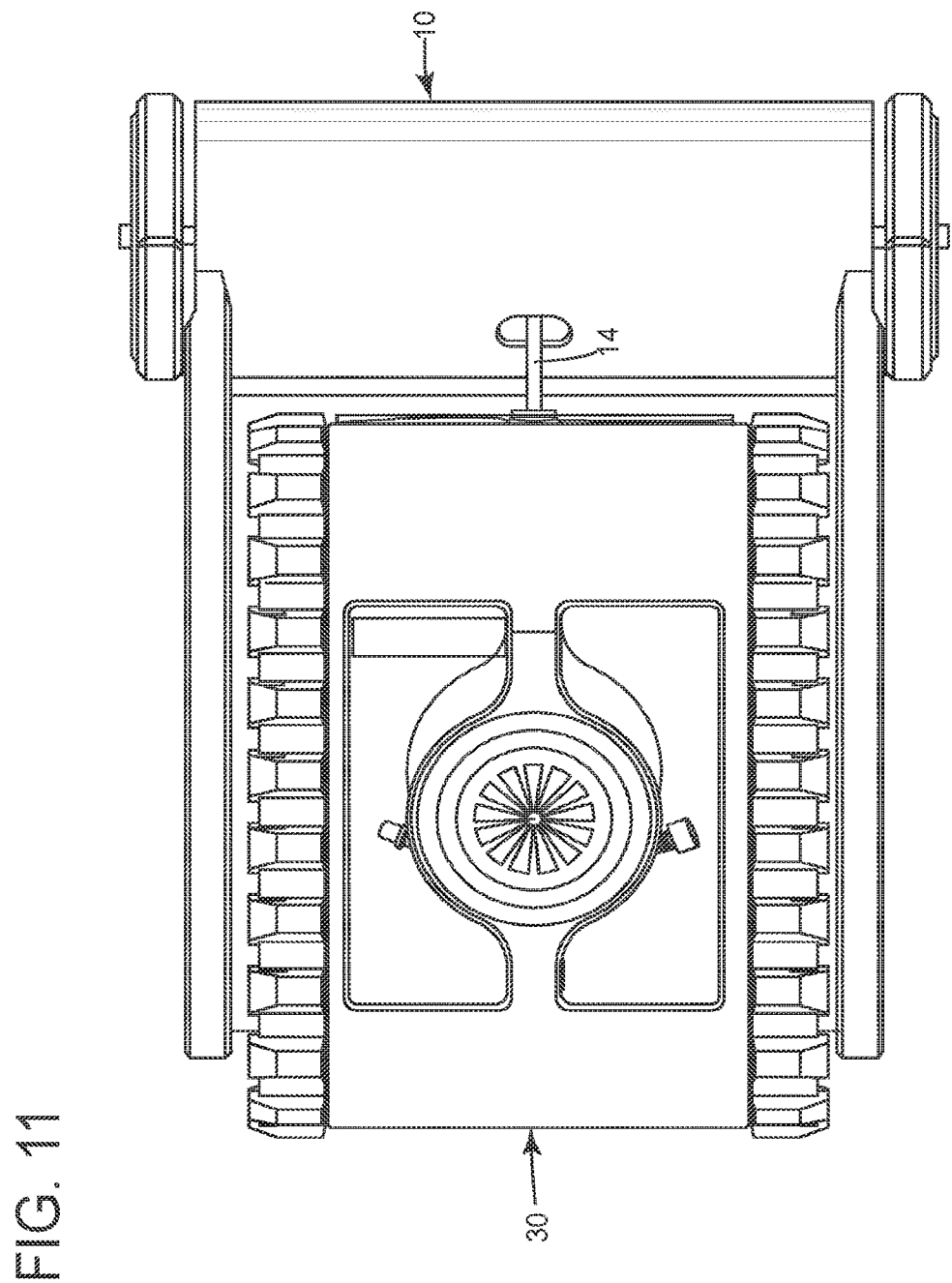

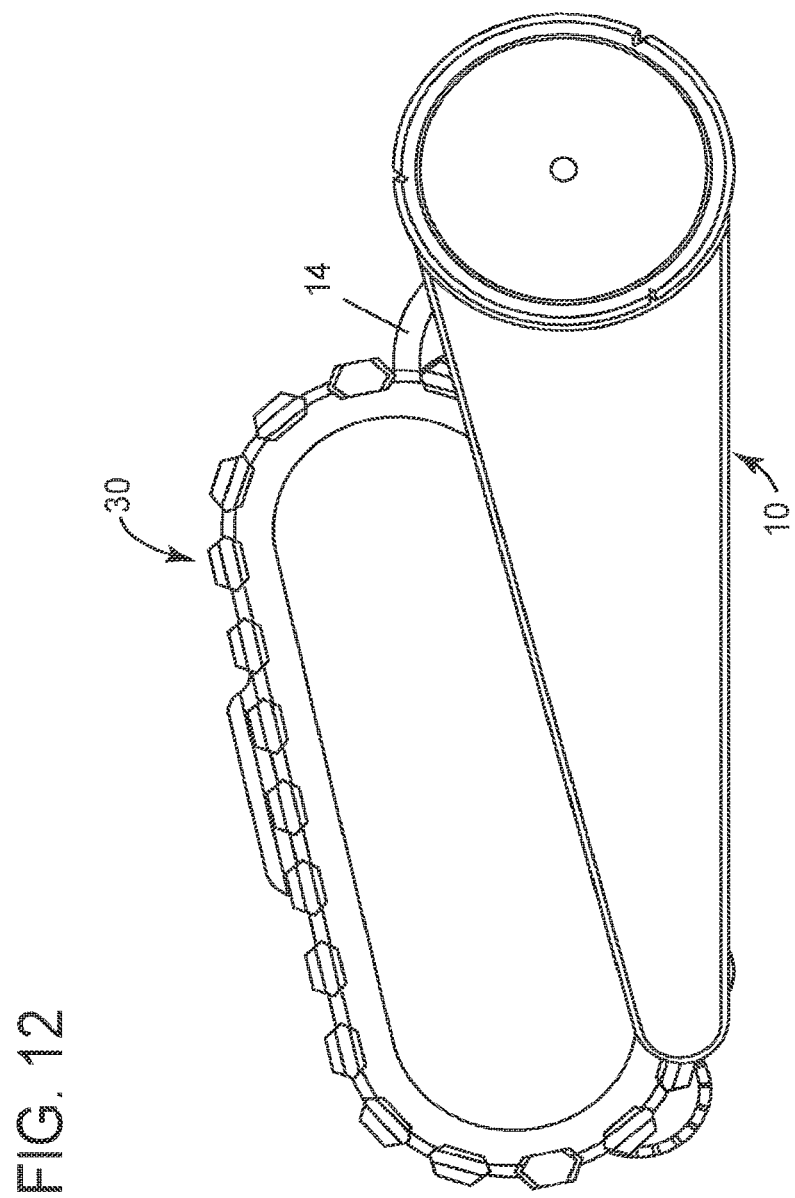

RAMPED PONTOON FOR RETRIEVING A POOL CLEANER

CROSS REFERENCE TO RELATED APPLICATION

This application is a division of U.S. application Ser. No. 15/578,389, filed Nov. 30, 2017, which is a U.S. national phase of PCT Application No. PCT/US2016/034266, filed May 26, 2016, which claims the benefit of U.S. Provisional Application No. 62/169,360, filed Jun. 1, 2015, all of which are hereby incorporated by reference.

FIELD OF THE INVENTION

The present invention relates to a ramped pontoon for retrieving a pool cleaner from a swimming pool or other water container.

BACKGROUND OF THE INVENTION

Pool cleaners that remain in the pool can be problematic while swimming, diving, playing and/or enjoying the pool. Therefore, many pool owners remove the pool cleaners from the water before they and/or their guests enter the pool. Many pool cleaners require human intervention for removing the cleaner from the pool water after cleaning cycle has completed. One such method for retrieving the pool cleaner requires a user to manually pull the device up out of the water by its cord. This can be a tedious and bothersome task because it requires human labor each and every time the pool cleaner is removed from the pool. The present invention provides a solution to the above problems.

SUMMARY OF THE INVENTION

The invention is directed to a floating platform dimensioned and configured to receive and transport an automated pool or tank cleaner on the surface of the water. For convenience, the floating platform is referred to below as a pontoon. The pontoon is also configured to control the retrieval of the pool cleaner. The pontoon includes a buoyant housing configured to float in water of a swimming pool and having a first end and a second end. An inclined platform or ramp is positioned in the pontoon housing at an angle down from the first end towards the second end. The pontoon includes a winch for winding and unwinding a cable connected to the pool cleaner.

In one embodiment, the pontoon includes at least one driven wheel positioned near the first end. Each driven wheel preferably includes extendable paddle blades which extend when the wheel rotates in a predetermined direction against the frictional force of the pool water.

In one embodiment, the pontoon includes a power source for powering the winch. In one embodiment, the power source includes a battery. In one embodiment, the pontoon includes a solar panel positioned on the ramped platform for charging the battery.

The pontoon can include one or more sensors, including: a touch sensor positioned to sense when the pool cleaner has reached the pontoon; a range sensor for detecting the distance between the pool cleaner and the pontoon; and/or a distance sensor for detecting the length of cable that has been retracted.

In one embodiment, the pontoon includes at least one passive wheel positioned near the second end for supporting the buoyant housing while traversing a solid surface.

In one embodiment, the ramped platform includes a high-friction surface for preventing the pool cleaner from sliding down after docking.

In one embodiment, the pontoon includes at least one vertical side wall extending laterally between the first end and the second end.

The invention further discloses a method for controlling the retrieval of a pool cleaner while submerged in pool water comprising: (a) providing a buoyant housing having a winch; (b) attaching a cable between the winch and the pool cleaner; and (c) winding up the winch to retrieve the pool cleaner from the pool water.

In one embodiment, the buoyant housing includes at least one driven wheel and the method further comprises the step of rotating the driven wheel for moving the buoyant housing along the surface of the pool water.

In one embodiment, the method further comprises the step of winding out the winch to release the pool cleaner.

In one embodiment, the buoyant housing includes at least one driven wheel and the method further comprises the step of rotating the driven wheel for enabling the buoyant housing to climb up a sidewall and out of the pool.

BRIEF DESCRIPTION OF THE DRAWINGS

The teachings of the present invention will be readily understood from the following detailed description when considered in conjunction with the accompanying drawings, in which;

FIG. 2 is a side view of the pontoon of FIG. 1;

FIG. 3 is a cross-sectional side view of the pontoon taken along section 3-3 of FIG. 1;

FIG. 11 is a top view of the pool cleaner combined with the pontoon in a docked position;

FIG. 12 is a side view of the pool cleaner combined with the pontoon in a docked position.

Figure 1:
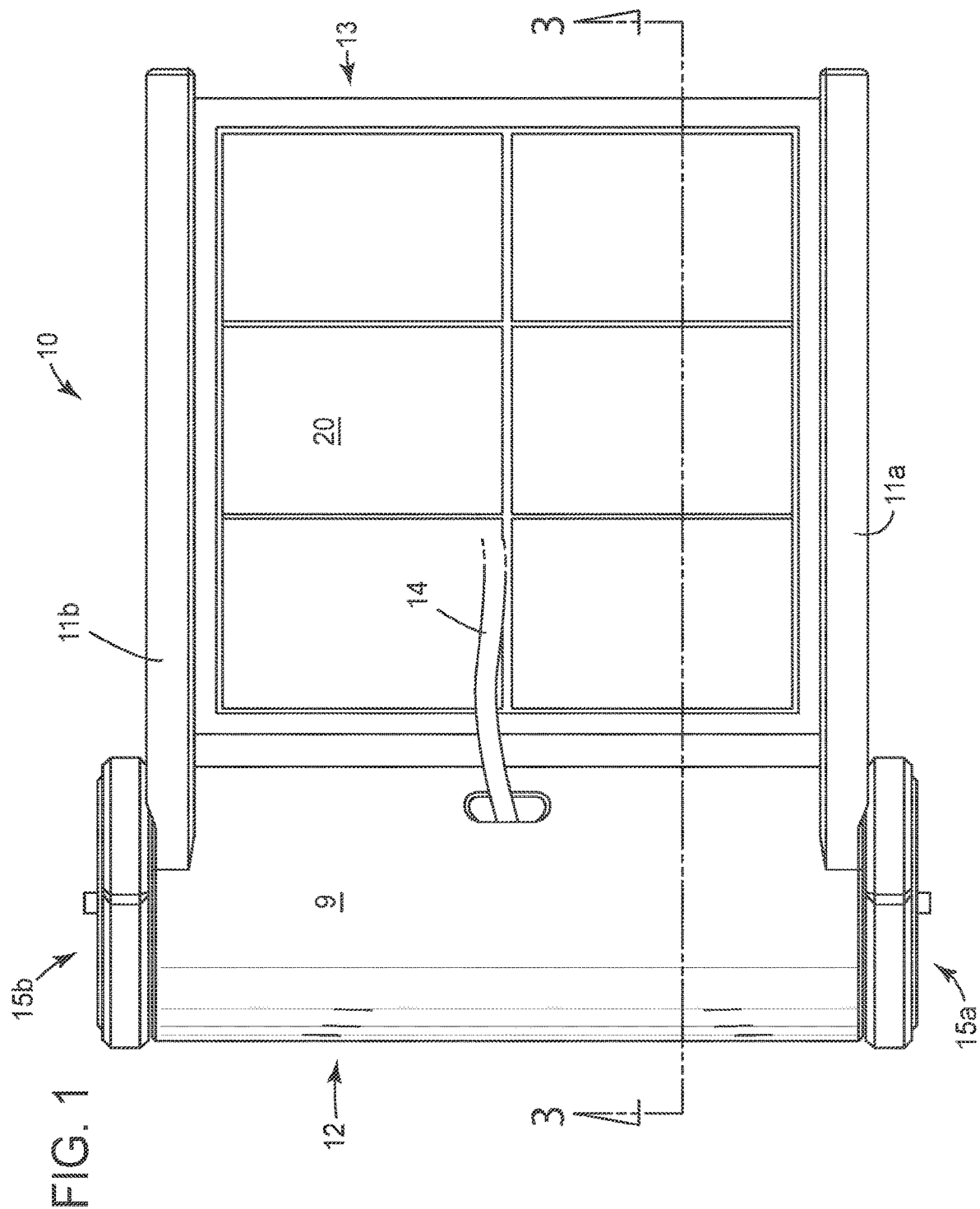
FIG. 1 is a top view of an embodiment of a ramped pontoon in accordance with the present invention.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION OF THE INVENTION

The present invention will be described in detail with reference to FIGS. 1-6.

As shown in the top view of FIG. 1, the floating pontoon 10 is formed from a buoyant housing 9 configured to float in water of a swimming pool or other water container, and having a first end 12 and a second end 13. An electric power cable 14, which is preferably reinforced to provide adequate tensile strength, is retractably and removably connected to a rotatable unwinder/retractor (e.g., a winch; see FIG. 3) positioned inside the housing 9 near the first end 12. In one embodiment, the power cable 14 is reinforced with a coated (water impermeable) steel wire or the like. The power cable 14 is configured to be connected to a pool cleaner (see FIGS. 7-12), wherein electrical power can be fed from the pontoon to the pool cleaner via the power cable 14. In one embodiment the cable 14 does not carry electricity and the pool cleaner receives its power from another source. The pontoon housing includes two vertical side walls 11a and 11b that extend between the first end 12 and second end 13, and prevent the pool cleaner from sliding off the platform 20 after it has been clocked on the platform. The platform 20 is preferably a flat surface positioned between the sidewalls 11a and 11b of the housing 9 and inclined at an acute angle from the first end 12 towards the second end 13 for providing a ramped entry/exit for the ingress/egress of the pool cleaner to and from the pontoon 10 (see FIGS. 2 and 3). In one embodiment, the surface of the platform 12 includes a high-friction material or coating or one or more protruding elements (not shown) and the like that engage with, and prevent the pool cleaner from sliding down the ramp after it has docked on the platform 12 at a predetermined position. In one embodiment, a series of solar panels 20 are positioned on the surface of the ramp, or elsewhere on the pontoon, for charging an on-board battery (see FIG. 3) when the pool cleaner is in the pool water. A pair of driven (active) wheels 15a and 15b (collectively forward wheels 15) are positioned proximate the first end 12. A person of ordinary skill in the art will appreciate that the number of driven wheels 15 is not considered limiting and can include one, two, three, four, five or more driven wheels. In another embodiment (not shown), the pontoon 10 does not include any driven wheels, such that the pontoon has no self-propulsion capability.

FIG. 2 is a side view of the pontoon 10 showing the first driven a wheel 15a positioned proximate the first end 12. In one embodiment, the housing includes a pair of smaller non-driven (passive) wheels 16a and 16b (collectively rear wheels 16) at the second (rear) end 13 (see FIG. 4). The driven wheels 15 and the free smaller wheels 16 allow the housing to roll along a rigid surface while the pontoon 10 is travelling under its own power outside of the pool. In addition, the smaller wheels 16 allow the housing 9 to roll over the pool deck or other hard surface, while the pontoon is being pulled by a user during transport.

FIG. 3 is a cross-sectional side view of the ramped pontoon taken along section 3-3 of FIG. 1 showing an on-board battery 22 which powers a geared motor 18 for rotating an axle 17 that (i) drives the forward pair of wheels 15, and/or (ii) rotates the winch 19 (see FIG. 4) for winding/unwinding the cable 14 that is connected to the rob pool cleaner. In another embodiment, a separate motor (not shown) can be included for allowing separate control of e driven wheels 15a and 15b and the winch 19. A transformer 21 can also be used in recharging the battery 22. In another embodiment, the power source can be art external battery or an external power supply (not shown) that is connected to the pontoon via a conventional floating power cable.

Figure 4:
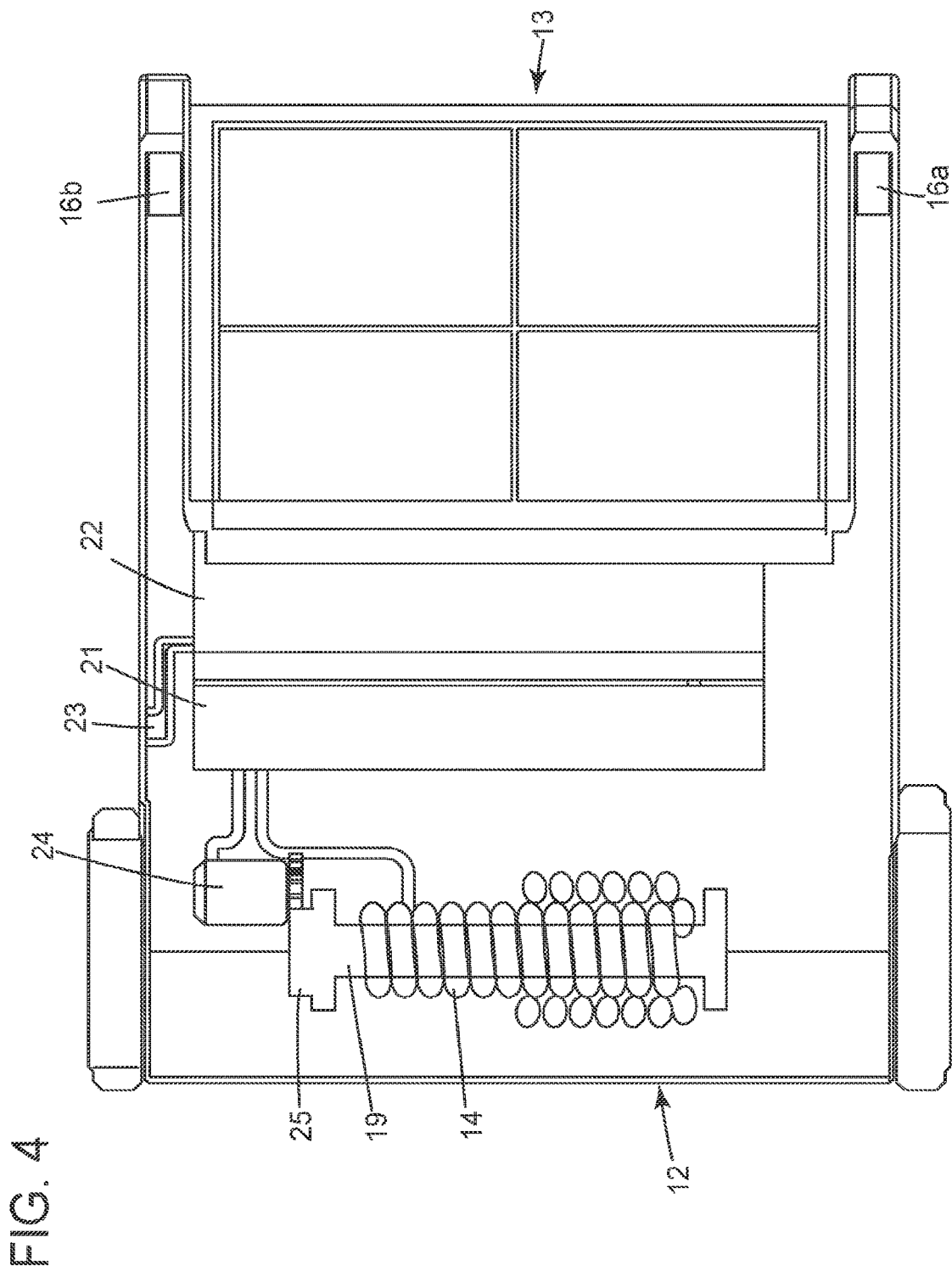
FIG. 4 is a cross-sectional top view of the pontoon taken along section 4-4 of FIG. 2.

FIG. 4 is a cross-sectional top view of the pontoon taken along section 4-4 of FIG. 2. The housing can include a charging socket 23 for manually recharging the battery 22 while the unit is not in e can recharge the battery 22 by plugging a free end of a second (e.g. poolside) power cable (not shown) into the socket 23 on the pontoon. In this view, the cable 14 is shown wound on the winch 19 in a retracted state. The motor 24 is connected to the winch 19 via a gear 25 for rotating the winch 19. The pair of smaller non-driven (passive) wheels 16a and 16b are shown positioned near the second end 13.

Figure 5:
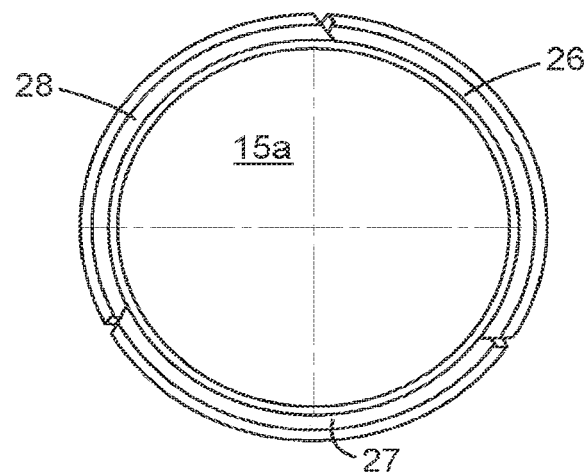
FIG. 5 is a side view of a driven wheel of the pontoon in its closed position.

FIG. 5 is a side view of the driven wheel 15a of the ramped pontoon in its closed position, wherein three paddle blades 26, 27, 28 are collapsed and rest flush against the circumference of the wheel. A person of ordinary skill in the art appreciate that the number of paddle blades is not considered limiting and can include one, two, three, four, five or more blades. In one embodiment, the paddle blades are hinged and biased to assume the closed position by springs (not shown).

Figure 6:
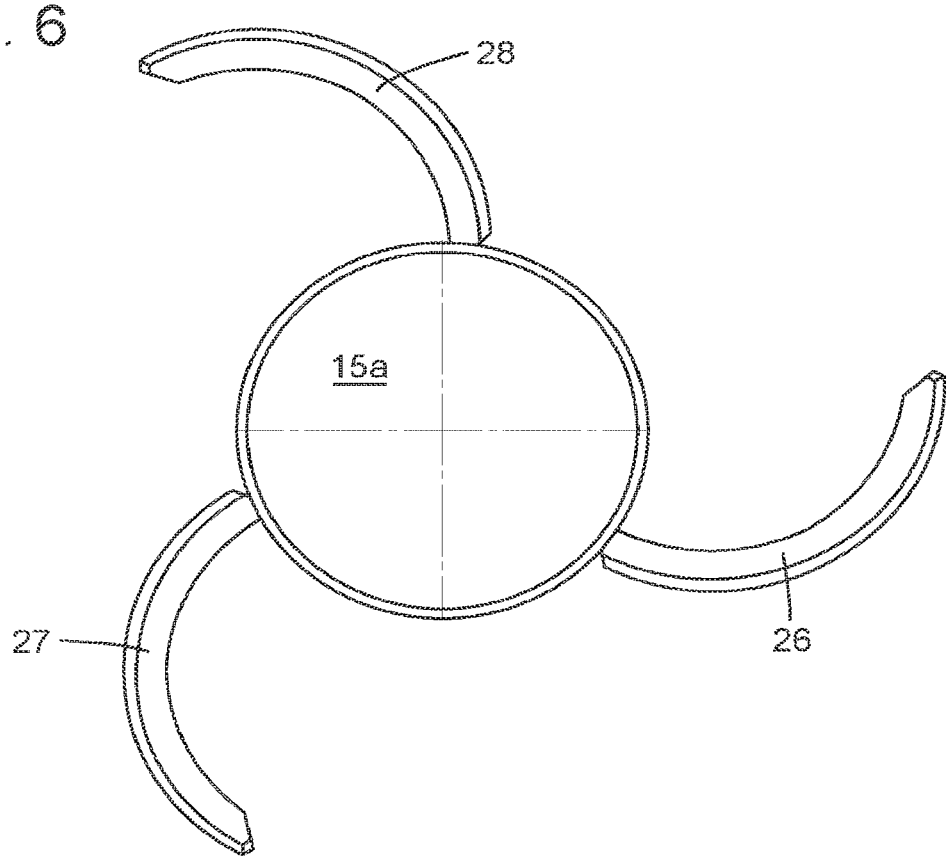
FIG. 6 is a side view of the driven wheel of the pontoon in its expanded position.

FIG. 6 is a side view of the driven wheel 15a of the pontoon 10 in its extended operational position, wherein the rotating paddle blades 26, 27, 28 will exert a propelling force to move the unit over the surface of the water. In one embodiment, the paddle blades extend when the wheels 15a and 15b rotate in a given direction against the frictional force of the pool water. Each paddle blade rotates open about a hinge (e.g. pivot about an axis) until it reaches a predetermined position, upon which further rotation is prevented by a stop element (not shown).

Figure 7:
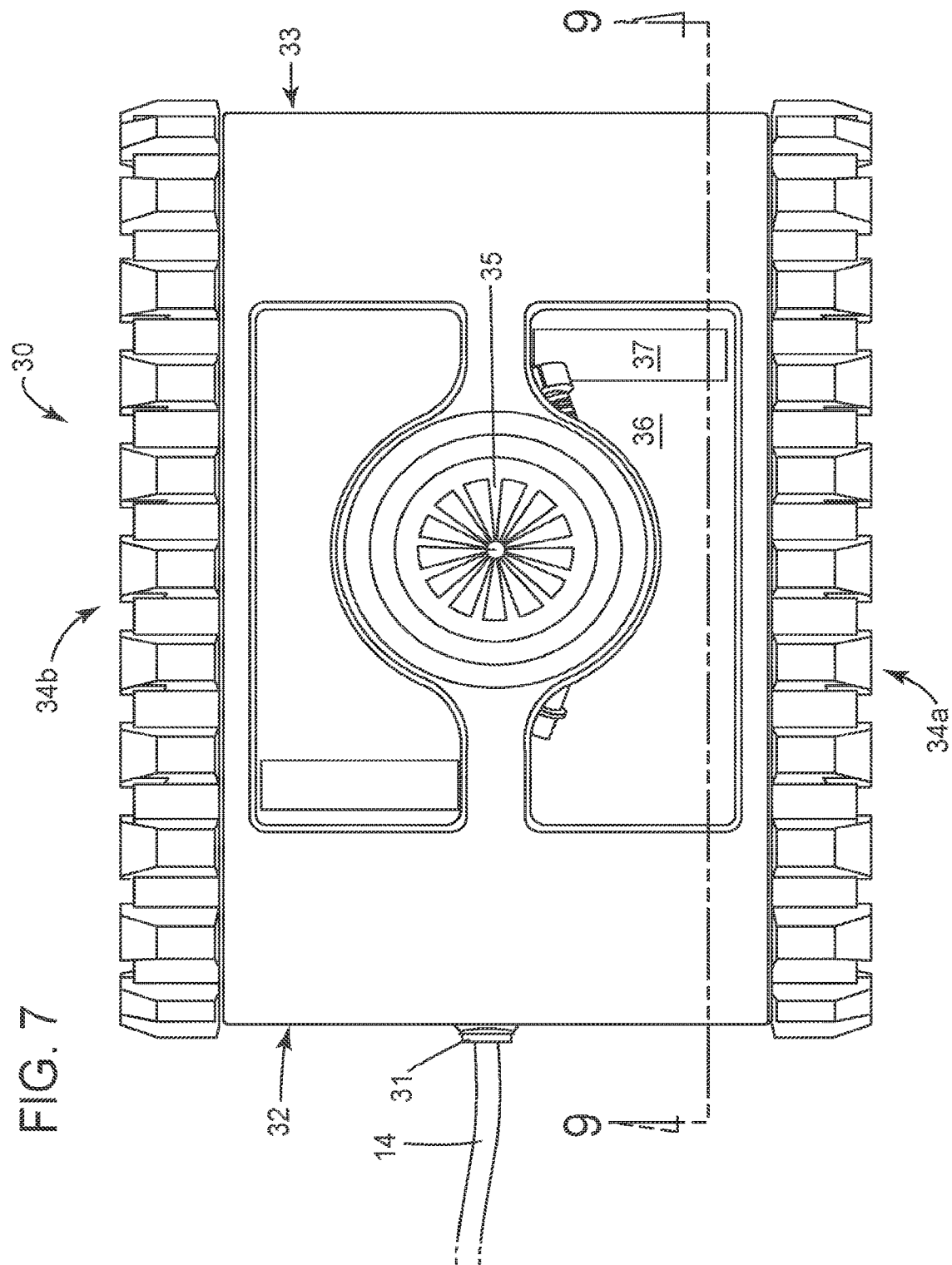
FIG. 7 is a top view of an illustrative pool cleaner suitable for use in the present invention.
Figure 8:
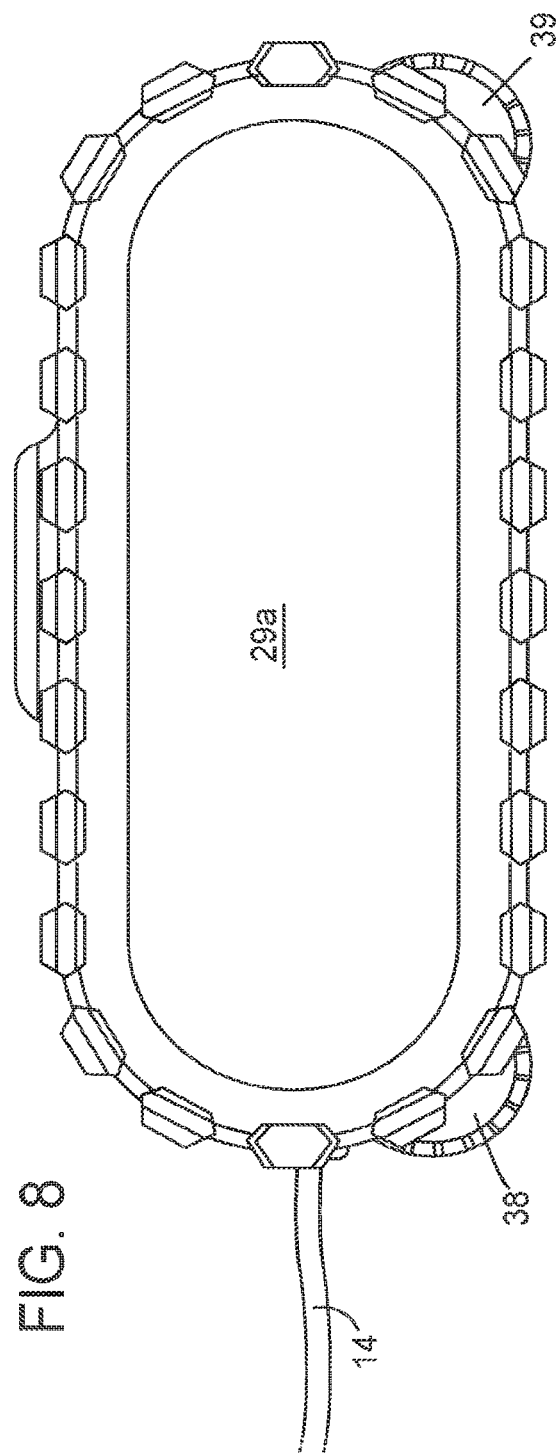
FIG. 8 is a side view of the pool cleaner of FIG. 7.
Figure 9:
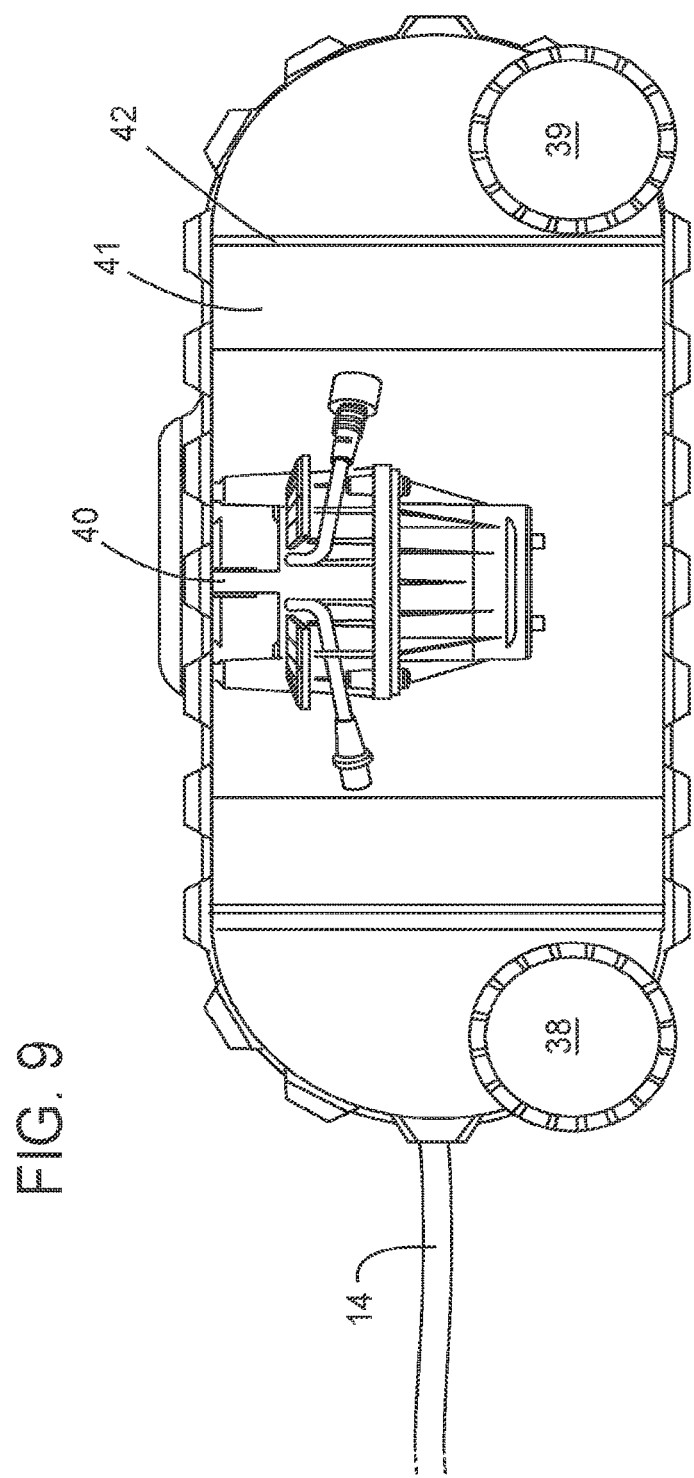
FIG. 9 is a cross-sectional side view of the pool cleaner taken along section 7-7 of FIG. 7.

Referring to FIGS. 7-9, a description will be provided of an exemplary pool cleaner in use with the pontoon 10. It should be understood that the pool cleaner described below is but a single non-limiting example. For example, the pool cleaner can include motor driven impellers that create a high pressure water jet to propel the cleaner on the pool surface being cleaned. Alternatively, the pool cleaner can include motor driven wheels, brushes and/or tracks for supporting, moving and guiding the cleaner on the pool surface to be cleaned, as illustrated in FIGS. 7-9.

FIG. 7 is a top view of the pool cleaner 30. The pool cleaner has a front end 32 and a rear end 33. The electric power cable 14 is connected from the pontoon housing to the cable socket/strain relief fitting 31 located on the front end 32 of the pool cleaner housing. The pool cleaner 30 includes a pair of motor driven tracks 34a and 34b an outlet 35 for discharging filtered water, a filter, e.g., a top access filter cartridge 36, and one or more bottom intake ports 37.

More specifically, the pool cleaner 30 includes at least one inlet port 37 provided on the bottom of the cleaner. When electric power is provided to the electric motor of the pump 40 via the power cable 14, the propeller of the pump rotates and causes water and debris at the surface beneath the cleaner to be drawn through the inlet and into the interior chamber of the cleaner, where the filter 41 captures and retains the debris and allows filtered water to be discharged back into the pool via the outlet 35.

FIG. 8 is a side view of the pool cleaner of FIG. 7, illustrating a first side plate 29a, self-contained drive motors (not shown), and two driven brushes 38 and 39. The power cable 14 supplies electrical power from the battery 22 housed onboard the pontoon 10 to the drive motors which power the tracks 34a and 34b and/or the brushes 38 and 39.

FIG. 9 is a cross-sectional side view of the pool cleaner 30 taken along section 9-9 of FIG. 7 showing illustratively a vertical pump motor 40, a filter cartridge/media 41, a secondary internal wall/filter area confinement 42, and driven axle/drive brushes 38 and 39 that transfer power to both driven tracks of the unit. Other configurations using the same or different elements can be used in the construction of the pool cleaner without limitation.

Figure 10:
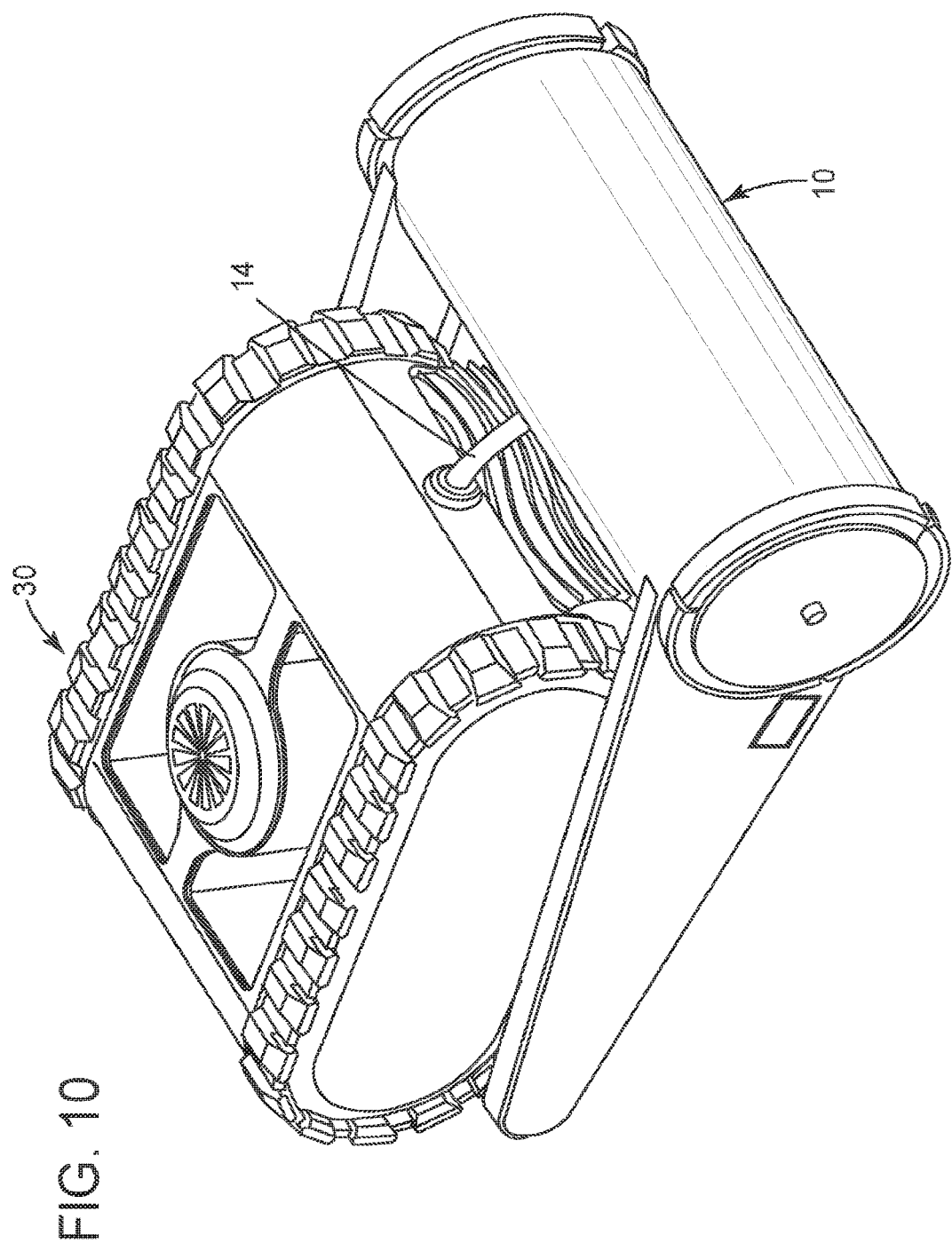
FIG. 10 is a perspective view of the pool cleaner combined with the pontoon in a docked position.

FIGS. 10-12 show a perspective view, top view, and side view, respectively, of pool cleaner 30 in a docked position on the ramp 20 of the pontoon 10, being joined together with the cable 14.

A method for the practice of the invention will now be described. After the pontoon carrying the pool cleaner is placed in the pool, the power cable 14 is unwound from the spool of the winch 19 to enable the pool cleaner 30 to descend to the bottom of the pool and initiate a cleaning program to clean the submerged pool surfaces. In one embodiment, a programmed controller transmits a signal to activate the pontoon winch 19 to retrieve the pool cleaner by winding the power cable 14 around the spool when the battery reaches a predetermined low voltage level, when the cleaning operation is completed, and/or after a predetermined time following the descent of the pool cleaner from the platform 20.

After the cable lifts and retrieves the cleaner off the bottom surface of the pool and docks it on the pontoon platform, the forward pair of wheels 15 is activated causing the extendable paddle blades (see FIGS. 5 and 6) to extend when encountering the frictional force of the pool water. The extended paddle wheels rotate and enable the pontoon to move across the water's surface to the pool wall and climb to exit the pool after the cleaning operation. In an alternative embodiment, the pontoon does not have any self-propulsion capability and requires that the user manually retrieve the pontoon from the pool. The user can then recharge the battery 22 by plugging a free end of a second (poolside) power cable (not shown) into a socket 23 on the pontoon (see FIG. 4). In an alternative embodiment, the pontoon includes solar panels which charge the battery 22 while not in use.

Figure 13A:
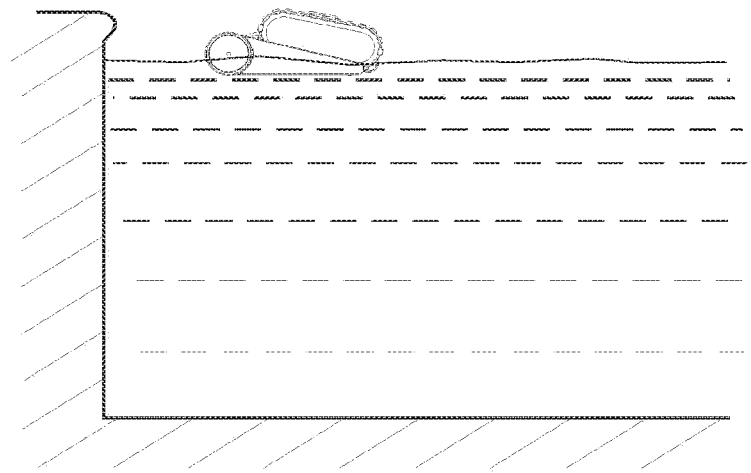
FIGS. 13a through 13i illustrate the operational procedure of the present invention.

An embodiment of a detailed operational procedure of the invention is shown in FIGS. 13*a* through 13*i*, and described below as follows:

With reference to FIG. 13*a* the pontoon carrying the pool cleaner is manually placed by a user in the pool on the top surface of the pool water. In another embodiment, the pontoon drives itself into the pool water while carrying the pool cleaner in a docked position.

Figure 13B:
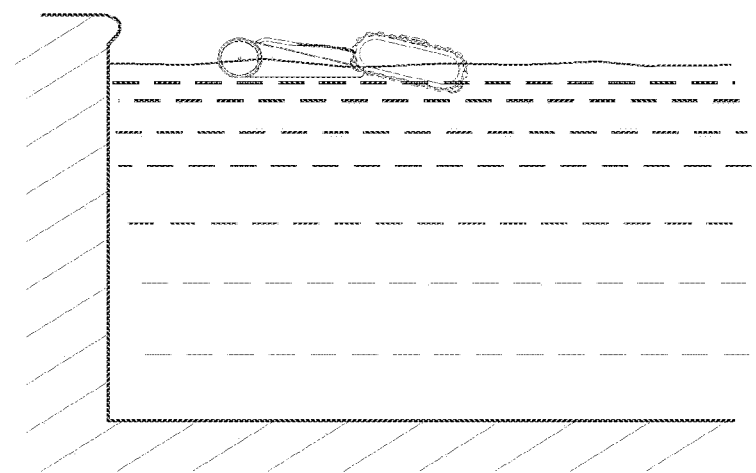

With reference to FIG. 13*b*, the pool cleaner drives off the ramped pontoon under its own power. In another embodiment, the user can release the pool cleaner manually from the pontoon.

Figure 13C:
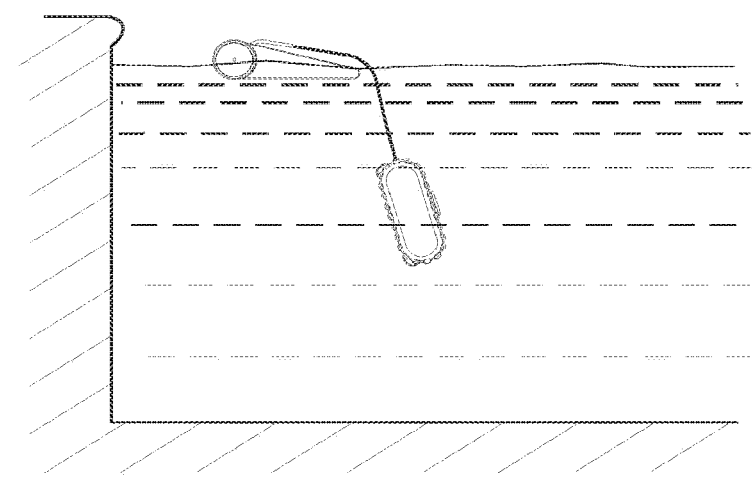

With reference to FIG. 13*c*, the cable connecting the pool cleaner to the ramped pontoon is unwound from e spool of the winch 19, thereby allowing the pool cleaner to descend to the bottom of the pool.

Figure 13D:
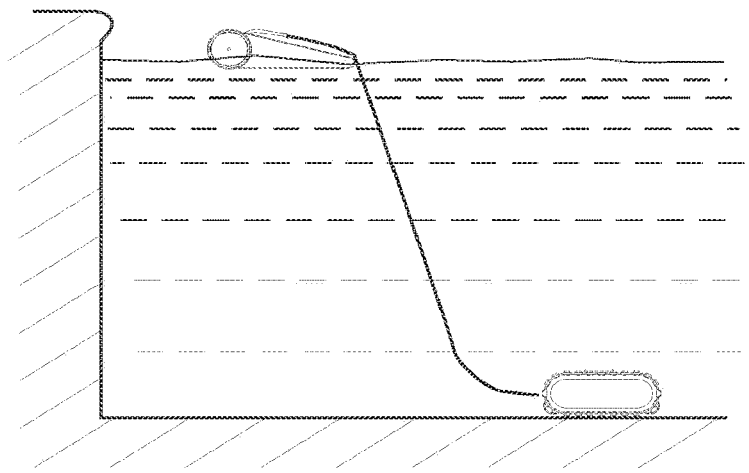

With reference to FIG. 13*d*, the pool cleaner operates its cleaning cycle as a self-propelled robotic pool cleaner while remaining tethered to the floating pontoon. In one embodiment, the pontoon generally remains in a position that is vertically above the pool cleaner so that the power cable will not become twisted or wrapped around the pontoon.

Figure 13E:
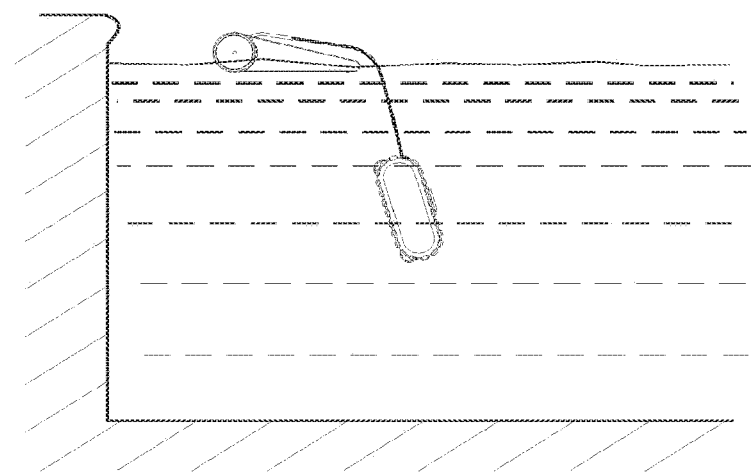

With reference to FIG. 13*e*, when the cleaning cycle is completed, the retractable cable is wound on the spool of the winch and the pool cleaner is pulled up towards the pontoon. In a preferred embodiment, the pool cleaner has neutral buoyancy. In other embodiments, the pool cleaner has negative or positive buoyancy. The pool cleaner is held against the bottom of the pool during the cleaning cycle because the cleaning pump creates a low pressure environment at the pool surface proximate the inlets, and an upwardly projecting jet stream of water which creates a downwardly directed force sufficient to keep the cleaner along the surface being cleaned. When the cleaning pump is shut off, the pool cleaner can float to the surface because of its neutral buoyancy with the assistance of the winch. The winch can be used to assist the pool cleaner to rise to the surface of the pool, but the winch is preferably shut off when the pool cleaner nears the surface of the water to allow the pool cleaner to float to the surface under its own buoyancy. In one embodiment, the pool cleaner includes a pair of laterally extending fins which assist in keeping the pool cleaner oriented in the normally upright position while it travels to the water surface. Once the pool cleaner has reached the water surface of the pool, the retractable cable is wound on the winch and the pool cleaner is pulled along the surface of the water towards the pontoon.

Figure 13F:
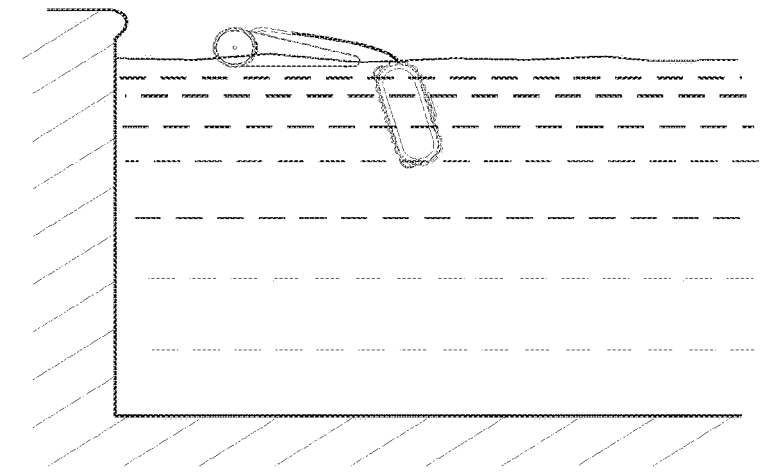

With reference to FIG. 13*f*, the pool cleaner is self-clocking on the pontoon via its internal driving system once it reaches the edge of the pontoon, so as to prevent excess strain on the power cable during the final docking sequence when the pool cleaner exits the pool water. The cable is connected to the pool cleaner at a predetermined position at its front end so that the pool cleaner automatically becomes oriented in the upright position facing forward when it reaches the edge of the pontoon. The pontoon includes sufficient buoyancy so that it will remain level with the surface of the pool and is configured so that it will not tip over when the pool cleaner begins its docking sequence. In one embodiment, ballast members can be positioned at the bottom of the pool cleaner and floating members can be positioned at the top of the pool cleaner to maintain an upright orientation. In one embodiment, the pontoon has on-board electronics which assist in properly docking the pool cleaner. The electronics can include a microprocessor and sensors. One or more touch sensors can be positioned around the edges of the pontoon for sensing when the cleaner has reached the edge of the pontoon. A range sensor can detect the distance between the pool cleaner and the pontoon. Another sensor can detect the length of cable that has been retracted and therefore the length of cable that remains between the winch and the pool cleaner. The sensors can transmit the data to the microprocessor for automatically controlling and adjusting the docking and undocking sequences in real time.

Figure 13G:
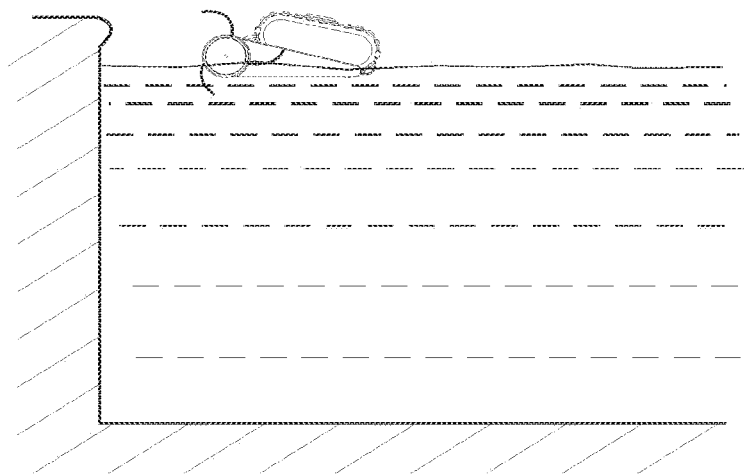

With reference to FIG. 13*g*, after the pool cleaner is docked, the driven wheels on the pontoon begin to rotate so that the blades expand to enable the pontoon to move to the edge of the peril. In another embodiment, the user manually pulls the pontoon to the edge of the pool, e.g. via a line (not shown) that tethers the pontoon along the side of the pool or by using an extension pole having a tool at its end (not shown) that engages with the pontoon.

Figure 13H:
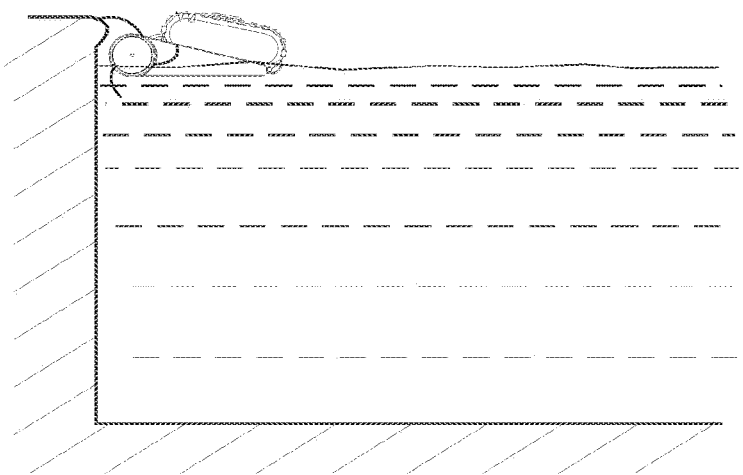

With reference to FIG. 13*h*, when the pontoon reaches the side wall of the pool, the expanded blades of the driven wheels engage with the pool wall to enable the pontoon to automatically climb the pool wall and exit the pool. In one embodiment, the blades expand radially to a distance that is sufficient so that the uppermost blade can engage the top edge of the side wall of the pool, thereby providing a stationary surface for the blades to grab onto for enabling the pontoon to be pulled upwardly as the driven wheels turn. In another embodiment, the user manually retrieves the pontoon from the water surface at the edge of the pool, e.g. by grasping the pontoon by hand and lifting it out of the pool.

Figure 13I:
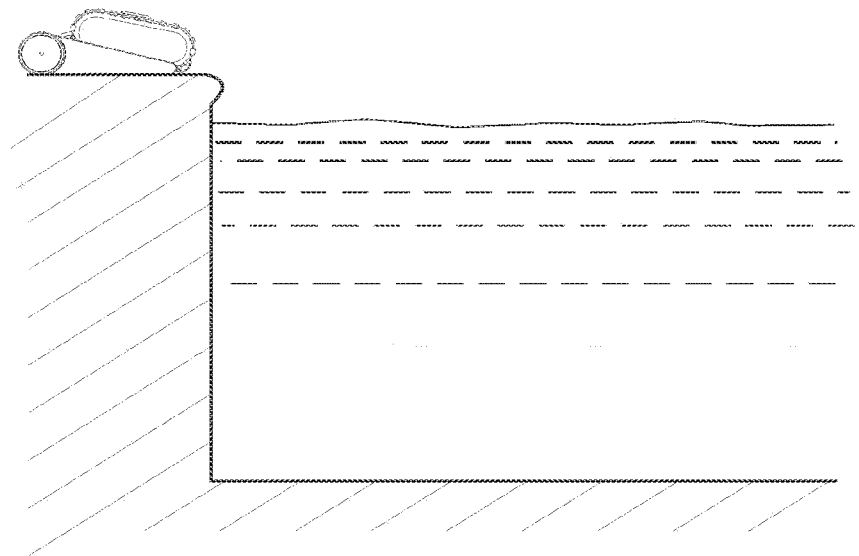

With reference to FIG. 13*i*, once the pontoon is fully emerged from the pool so that it is level on the ground, the expanded paddles on the drive wheels return to the closed/collapsed position and drive the pontoon to a position from the pool and then the pontoon shuts down. Unlike when the pontoon is floating on the pool water, outside of the pool the weight of the pontoon combined with the pool cleaner allows the outer surface of the drive wheels to frictionally engage with the ground to propel the unit without the need to have the paddles in their expanded position. In one embodiment, the outer surface of the drive wheels includes a high friction material or coating or one or more protruding elements (not shown) and the like to ensure that the wheels maintain adequate traction, even while travelling over a smooth surface outside of the pool, such as outdoor patio tiling or the like. In another embodiment, the user manually transports the pontoon to a desired resting location, e.g. by carrying it or pulling it along the ground by hand.

From the above description, it will be understood that the invention is directed to a floating pontoon and pool cleaner combination, wherein the pontoon is configured to control the retrieval of the pool cleaner. In addition, the pontoon can be configured to control the release and/or operation of the pool cleaner. The pontoon can exit the pool automatically after the cleaning operation or can be manually retrieved by a user.

Although an exemplary description of the invention has been set forth above to enable those of ordinary skill in the art to make and use the invention, that description should not be construed to limit the invention, and various modifications and variations can be made to the description without departing from the scope of the invention, as will be understood by those with ordinary skill in the art, and the scope thereof is determined by the claims that follow.

The invention claimed is:

1. A method for controlling retrieval of a pool cleaner while submerged in pool water comprising:
   a. providing a buoyant housing having a winch in a swimming pool;
   b. attaching a cable between the winch and the pool cleaner; and
   c. winding up the winch to retrieve the pool cleaner from the pool water.

2. The method of claim 1, wherein the buoyant housing includes at least one driven wheel and the method further comprises the step of rotating the driven wheel for moving the buoyant housing along a surface of the pool water.

3. The method of claim 1, further comprising the step of winding out the winch to release the pool cleaner from the buoyant housing.

4. The method of claim 1, wherein the buoyant housing includes at least one driven wheel and the method further comprises the step of rotating the driven wheel for enabling the buoyant housing to climb up a sidewall and out of the swimming pool.

5. A method of operating a pool cleaner within a swimming pool, comprising:
   a. introducing the pool cleaner into water of the swimming pool;
   b. introducing a buoyant pontoon into water of the swimming pool, the buoyant pontoon (i) comprising a winch and a platform and (ii) being connected to the pool cleaner via a cable;
   c. causing the pool cleaner to clean debris from water of the swimming pool; and
   d. causing the winch to wind the cable until the pool cleaner is supported by the platform while the buoyant pontoon floats on water of the swimming pool.

6. A method of operating a pool cleaner within a swimming pool, comprising:
   a. introducing a buoyant pontoon into water of the swimming pool, the buoyant pontoon (i) comprising a winch and a platform on which the pool cleaner is supported while the buoyant pontoon floats on water of the swimming pool and (ii) being connected to the pool cleaner via a cable;
   b. causing the winch to unwind the cable until the pool cleaner is submerged in water of the swimming pool; and
   c. causing the pool cleaner to clean debris from water of the swimming pool.

7. The method of claim 6, further comprising causing the winch to wind the cable until the pool cleaner is again supported by the platform.

* * * * *